US012730910B2

(12) United States Patent
Srivastava et al.

(10) Patent No.: US 12,730,910 B2
(45) Date of Patent: Sep. 8, 2026

(54) FINE-GRAINED DATA STRUCTURE ELEMENT ACCESS CONTROL

(71) Applicant: Wells Fargo Bank, N.A., San Francisco, CA (US)

(72) Inventors: Gaurav Prakash Srivastava, Charlotte, NC (US); Michael Scott Rumble, Davidson, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 101 days.

(21) Appl. No.: 18/788,978

(22) Filed: Jul. 30, 2024

(65) Prior Publication Data

US 2026/0037647 A1 Feb. 5, 2026

(51) Int. Cl.
*G06F 21/60* (2013.01)
*H04L 9/40* (2022.01)

(52) U.S. Cl.
CPC .... *G06F 21/604* (2013.01); *G06F 2221/2113* (2013.01); *G06F 2221/2141* (2013.01); *H04L 63/10* (2013.01)

(58) Field of Classification Search
CPC .......... G06F 21/604; G06F 2221/2113; G06F 2221/2141; H04L 63/10
See application file for complete search history.

(56) References Cited

U.S. PATENT DOCUMENTS

| | | | | |
|---|---|---|---|---|
| 2009/0177688 | A1* | 7/2009 | Karlsen | G06Q 10/06 |
| 2020/0106780 | A1* | 4/2020 | Malliah | G06F 16/437 |
| 2021/0342084 | A1* | 11/2021 | Ng | G06F 3/061 |

* cited by examiner

*Primary Examiner* — Ellen Tran
(74) *Attorney, Agent, or Firm* — SCHWEGMAN LUNDBERG & WOESSNER, P.A.

(57) ABSTRACT

System and techniques for implementing a fine-grained access control structure for a data structure are described herein. An identification of an access vector for an element of a hierarchical data structure can be obtained and used to search the hierarchical data structure to locate a portion of the hierarchical data structure that includes the element. A representation of the portion of the hierarchical data structure can be rendered to a user interface that includes a control to assign an access permission to the element. Once an input from the control to modify an access to the hierarchical data structure is received, the hierarchical data structure can be updated based on the input from the control.

20 Claims, 7 Drawing Sheets

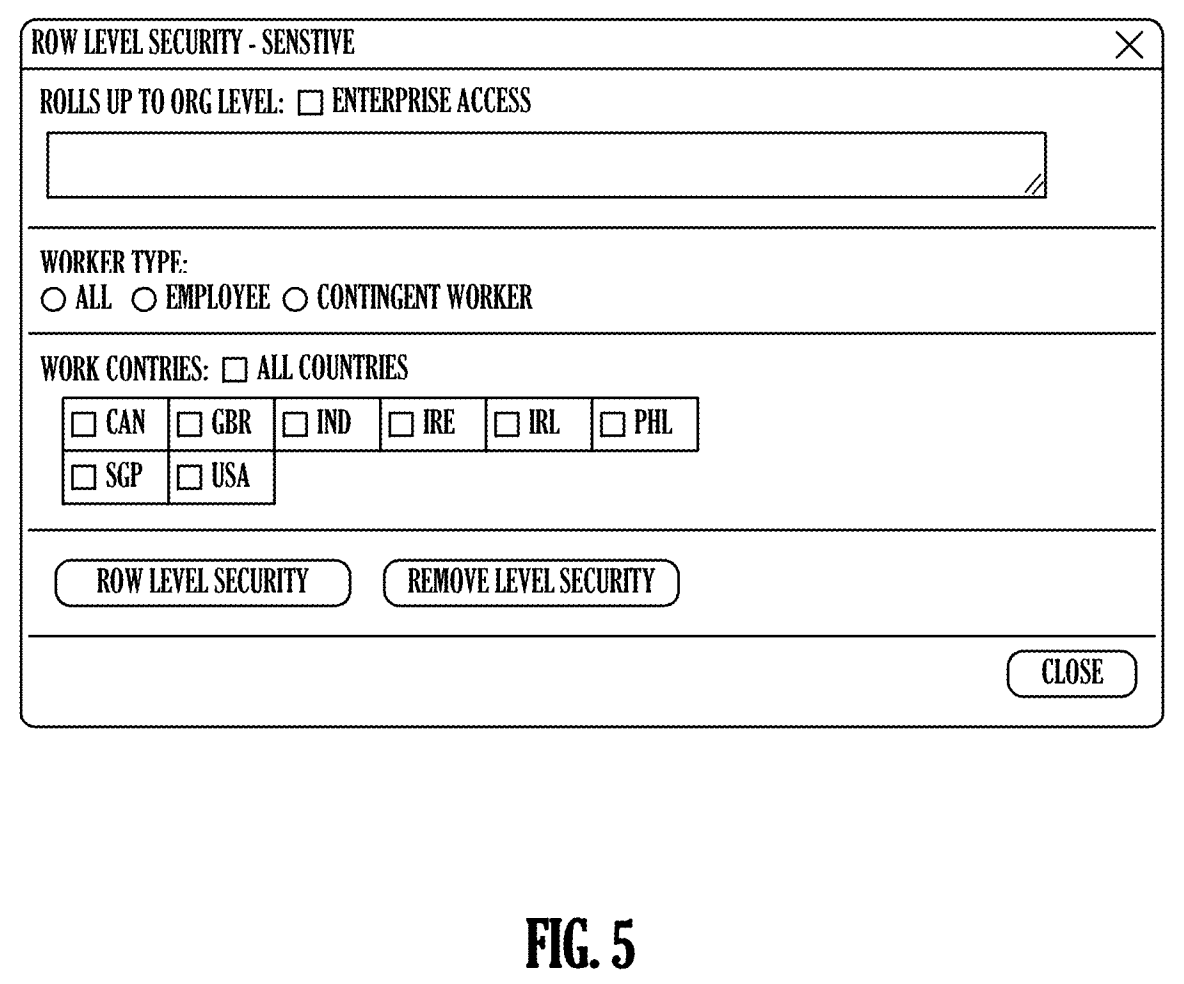

ROW LEVEL SECURITY - SENSTIVE
ROLLS UP TO ORG LEVEL: ☐ ENTERPRISE ACCESS
WORKER TYPE:
○ ALL ○ EMPLOYEE ○ CONTINGENT WORKER
WORK CONTRIES: ☐ ALL COUNTRIES
☐ CAN ☐ GBR ☐ IND ☐ IRE ☐ IRL ☐ PHL
☐ SGP ☐ USA
ROW LEVEL SECURITY
REMOVE LEVEL SECURITY
CLOSE

FIG. 5

FINE-GRAINED DATA STRUCTURE ELEMENT ACCESS CONTROL

TECHNICAL FIELD

Embodiments described herein generally relate to computer security and more specifically to fine-grained data structure element access control.

BACKGROUND

Computer data access control is used to regulate who or what can view or use resources in a computing environment. Access control typically involves mechanisms such as Access Control Lists (ACLs), Role-Based Access Control (RBAC), or Attribute-Based Access Control (ABAC). ACLs specify individual permissions for each user or system process regarding specific data objects (e.g., elements, cells, etc.), providing granular control over read, write, or execute permissions. RBAC assigns access rights based on user roles within an organization, simplifying management by grouping permissions based on defined roles. ABAC uses policies that incorporate various attributes—such as user characteristics, resource type, and environmental conditions—to grant access, offering dynamic and context-aware control. These techniques are implemented through authentication or authorization processes, ensuring that only authenticated users with appropriate permissions can access or modify data. Access controls are used to protect sensitive information, preventing unauthorized access, or ensuring compliance with security policies and regulatory requirements.

Data consumption vectors are the pathways through which data is accessed, retrieved, or used from a data structure, such as a database, that may be subject to access control. These vectors include applications, interfaces, or services that interact with the database to provide information to end-users or systems. For example, an employee website may query a database to display personalized information such as payroll details or work schedules, adhering to access control policies to ensure that employees can only view their own data. Performance reports are another possible data consumption vector, where analytic tools aggregate or analyze data to generate insights on employee productivity or business metrics, with access controls ensuring that sensitive data is only available to authorized analysts. APIs (Application Programming Interfaces) serve as another possible data consumption vector, enabling external applications to securely fetch or manipulate data according to predefined access permissions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates an example of a user interface for row level element access control, according to an embodiment.

DETAILED DESCRIPTION

Figure 1:
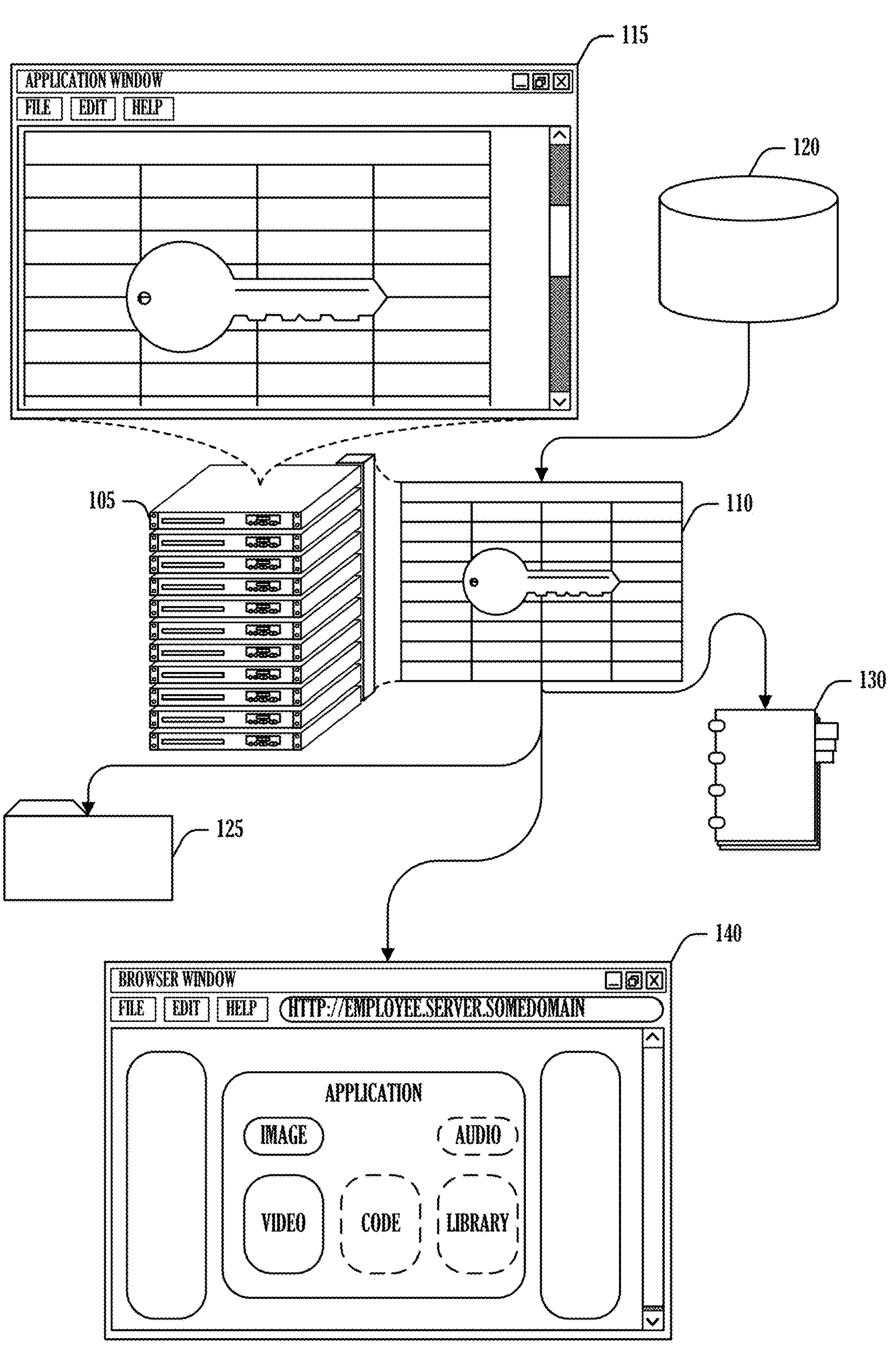
FIG. 1 is a block diagram of an example of an environment including a system for fine-grained data structure element access control, according to an embodiment.

Because data consumption vectors can expose sensitive information in a variety of contexts, access control of the data consumption vectors can be important to maintain data integrity, confidentiality, or compliance with security protocols, ensuring that data access is appropriately restricted and monitored. In general, data governance establishes policies, procedures, or standards to ensure high data quality, effective data management, and robust security across an organization.

Data governance can include column, row, and cell-level access controls to manage data availability, usability, integrity, or security. Column-level controls determine which users can access specific fields within a database, ensuring sensitive information is only visible to authorized personnel. Row-level controls restrict access to specific records, enabling users to view or manipulate data only pertinent to their role. Cell-level controls provide the highest granularity, permitting access to individual data cells based on strict criteria.

Access controls are part of broader practices that include data quality assurance, ensuring data accuracy and completeness; data lifecycle management, overseeing data from creation to deletion; or compliance with regulatory and legal requirements. Data stewardship assigns ownership and accountability, ensuring that data is consistently managed and trustworthy, facilitating informed business decisions.

Typical approachs to data governance can include varying degrees of access control resolution or communications with regard to access. Examples can include the creation of custom views or flat file feeds tailored for each consuming vector (e.g., application). This approach, while potentially effective, involves significant overhead in terms of development and maintenance. Each custom view or flat file feed generally involves custom design, implementation, and updating to reflect any changes in the underlying data structure or access requirements, leading to increased complexity and resource expenditure. These approaches also often fail to recognize the integrated nature of much sensitive information, such as employee information, and also fail to understand how that information is consumed. This can be particularly problematic in heavily regulated environments where the consumption of data is restricted.

The techniques described herein offer an approach for fine-grained access control of data structure elements. Such "fine-grained" control can include record (e.g., row) or element (e.g., column) controls for the input data. This control also includes an ability to identify the data structure element by the way in which the data is consumed. Thus, a data consumption vector can be used by, for example, security personal to identify the data element and then adjust access control rights.

Implementing this fine-grained access control for data structure elements provides several benefits. For example, the deployment of applications that require access to sensitive (e.g., human resources) data can be accelerated. By enabling precise control over which data elements can be accessed and by whom, development teams can quickly build and deploy applications without extensive custom data management solutions. Also, the fine-grained access control ensures a consistent architectural approach to data access. This consistency simplifies the overall data management strategy, reduces the risk of errors, and ensures that data access policies are uniformly applied across all applications and systems. It also supports compliance with internal and external data governance standards by providing clear and enforceable access rules.

The fine-grained access control described herein can simplify the governance of data access. By enabling data consumption vector searching and detailed control over data permissions at the column, row, or cell level, organizations can more easily manage and audit data access, ensuring that only authorized users can view or manipulate sensitive information. This granular level of control promotes data integrity and security. Additionally, this fine-grained access control can enhance communication with consuming applications through standardized formatting or customizable filtering. Standardized data formats ensure that applications can seamlessly interpret and utilize the data they receive, reducing the need for custom parsing or transformation logic. Customizable filtering enables applications to request and receive only the specific data they need, improving performance and reducing unnecessary data exposure. Additional details and examples are provided below.

FIG. 1 is a block diagram of an example of an environment including a system 105 for fine-grained data structure element access control, according to an embodiment. The system 105 includes processing circuitry, storage (e.g., power-stable storage such as a hard drive, solid state drive, etc.), and memory. The memory is generally used to maintain running state information for the system 105 that is usually discarded between system power cycles or restarts. The memory and the storage are both forms of computer readable media. The processing circuitry or software residing in the memory or storage executing on the processing circuitry configure the system 105 to perform various operations when in operation.

The system 105 implements (e.g., hosts, executes, etc.) a hierarchical data structure 110 that includes access control features. The hierarchical data structure 110 can receive data from external data sources (e.g., the database 120), such as third party systems, human resources (HR) databases, etc. The hierarchical data structure 110 can also be used for access control of data from the database 120 or can include data itself. These data can be used to produce data consumption products (e.g., access vectors) such as records 125 for other data systems, a report 130, or an application 140 (e.g., a website of employee performance, current safety statistics, etc.).

To implement the fine-grained data structure element access control, the processing circuitry can be configured to obtain (e.g., retrieve or receive) identification of an access vector for an element of hierarchical data structure 110. For example, the processing circuitry can be configured to provide (e.g., render, transmit, host a server, etc.) the user interface 115 (UI) that can be used, for example, by a user to select an available access vector. Thus, the user interface 115 can present a list of access vectors for data included in the hierarchical data structure 110 from which the user can select the access vector. Such a selection can result in the identification (e.g., operational code, string, etc.) for the access vector.

In an example, the access vector is a person. This example notes that the consumer of data may be a person, such as a manager, report writer, an employee etc. In this case, the identification of the access vector can include an employee ID or the like.

In an example, the access vector is a service that accesses the hierarchical data structure 110. Such services can include a web server to produce the application 140, a report service (e.g., a batch process) to produce the report 130, or the like. Service identification can include a service ID, service name, address of hardware—or a virtual machine—among others. As noted above, in an example, the service provides content to a web page (e.g., the application 140) configured to enable an authorized user to access the element. In an example, the service provides content to a file (e.g., the record 125) configured to enable an authorized user to access the element when the file is accessed by the authorized user.

The processing circuitry is configured to search the hierarchical data structure 110 based on the identification of the access vector to locate a portion of the hierarchical data structure 110 that includes the element. Thus, instead of, for example, searching for a particular security parameter, the relevant element from the hierarchical data structure 110 can be identified based on how that element is consumed. This consumption tracking can be supported by metadata in the hierarchical data structure 110 or by an external data structure (e.g., managed by the system 105 or elsewhere). For example, when an application or user requests access to the data element, the requesting entity can be authenticated and checked against the access controls in the hierarchical data structure 110. If the entity passes authorization, the entity can be registered to the consumption data structure to track use of the data element. Then, for example, if it becomes necessary to identify what data elements are used in the report 130, the report 130 access vector can be used to identify these data elements.

In an example, the portion of the hierarchical data structure is a record of an employee. Records like employee records can be represented in many databases as a row where fields of the record are represented as columns. In other data configurations, such as object databases or structures, the record tends to be identified by a name, key, or hash used to locate the bits of the record on a filesystem, bit bucket, or the like. In an example, the element is a field in the record.

In an example, the processing circuitry is configured to establish a connection to a second data structure—such as the database 120—that includes a version of data stored in the element. Here, the version of data refers to possibly different data that corresponds to a label or intent. For example, if the label, or intent, is "name" then the different version of the data is a different name. Consider a scenario where the hierarchical data structure 110 provides data for report generation (e.g., the report 130) and the database 120 is a human resources system. If an employee changes their name, this change is likely reflected in the human resources system but not in the hierarchical data structure 110. It would be useful, then, to update the hierarchical data structure 110 using the version of the data in the database 120. Accordingly, in an example, the processing circuitry is configured to overwrite the data stored in the element with data from the second data structure via the connection.

In an example, the overwriting of the data stored in the element is periodic. In an example, the overwriting of the data stored in the element is based on a trigger. For periodic writes, one could use a daily schedule, weekly, etc. Here, the schedule dictates when changes will be captured. Trigger based overwrites are arguably more efficient because changes are only captured when they occur. For example, the hierarchical data structure 110 can be subscribed to a pub-sub facility in which changes to records in the database 120 are published. Then, the publication of the change operates as a trigger.

When overwriting the data a variety of techniques can be employed to determine precedence. For example, a predefined precedence order can be used, such that disagreements in the data versions are resolved by taking the value from the source with the highest precedence. Here, for example, if the database 120 has a higher precedence than the hierarchical data structure 110, the data from the database 120 will always overwrite the data in the hierarchical data structure 110.

Figure 3:
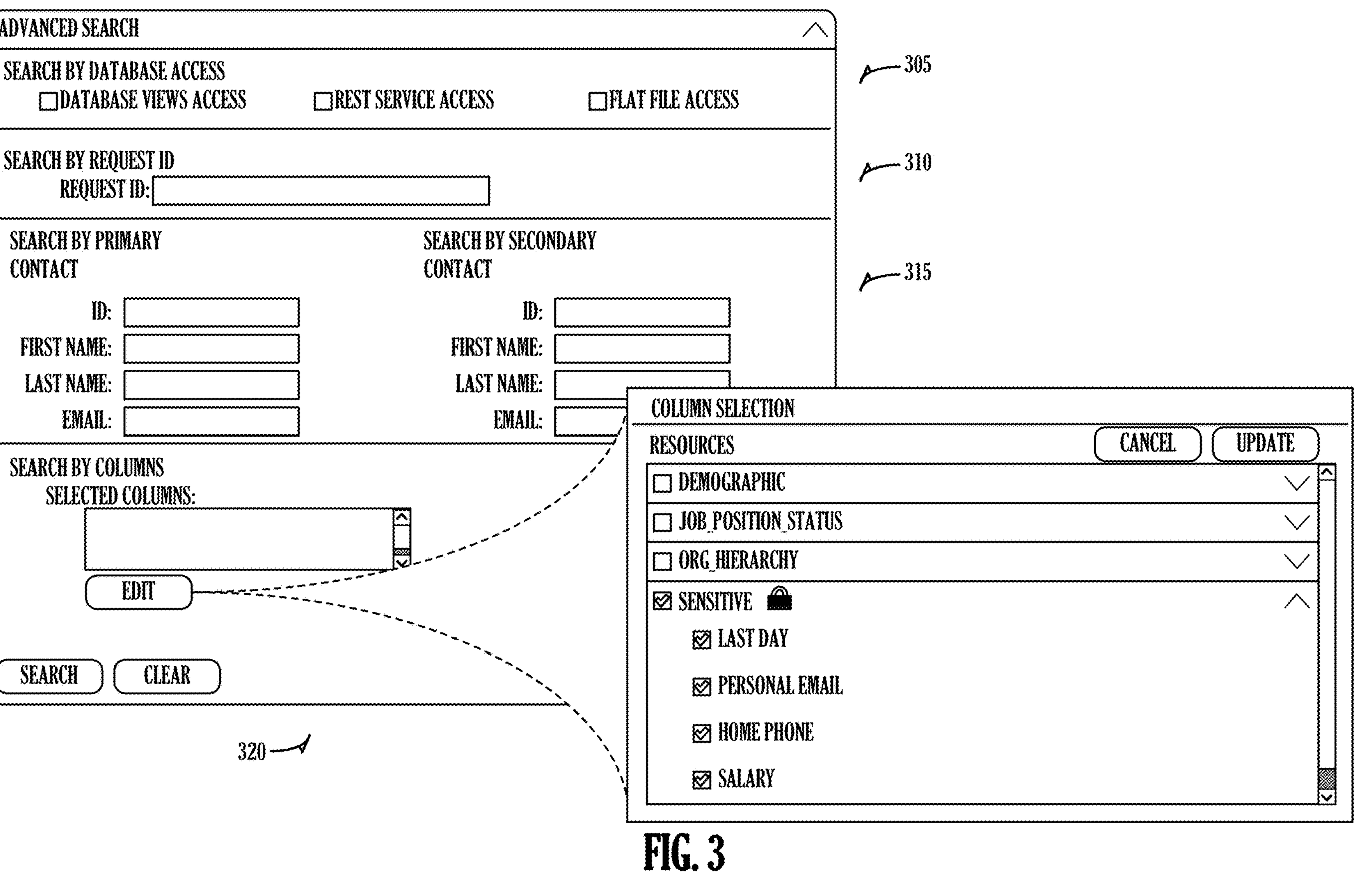
FIG. 3 illustrates an example of a user interface to locate sensitive information according to an access vector, according to an embodiment.
Figure 4:
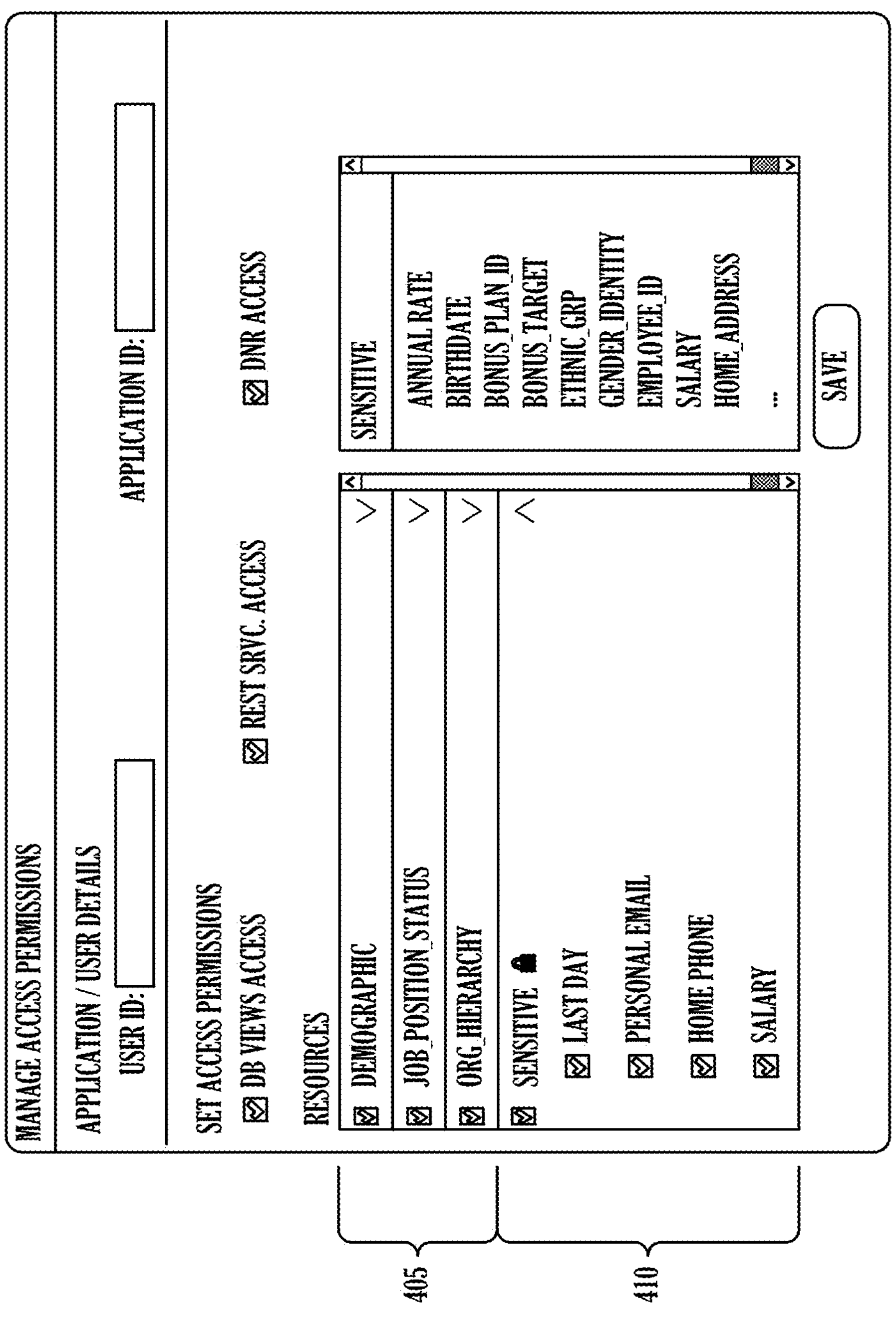
FIG. 4 illustrates an example of a user interface for column level element access control, according to an embodiment.

The processing circuitry is configured to render a representation of the portion of the hierarchical data structure 110 to the user interface 115. This representation enables the user of the user interface 115 to view or manipulate portions of the hierarchical data structure 110. In an example, the user interface includes a control to assign an access permission to the element. In an example, where the access vector is a person, the control enables a user of the user interface to deselect access for the person. In an example, where the access vector is a person and the person is selected to gain access to the element, wherein the control enables a user of the user interface to select access for the person. FIGS. 3-5 provide some examples of implementations for the user interface 115 and the controls.

The processing circuitry is configured to receive input from the control to modify an access to the hierarchical data structure 110. This is the return, or action, of the user interface 115 that provide the processing circuitry with the user selected change in the element access. Generally, such input will provide the processing circuitry with both the element (e.g., a label on the control that corresponds to the element) and the changed value (e.g., access list modification, selection of checkbox, etc.).

The processing circuitry is configured to update the hierarchical data structure 110 based on the input from the control to create an updated hierarchical data structure. This represents the full cycle from displaying the portion of the hierarchical data structure 110 in the user interface 115, to receiving the change desired by the user as represented by the input from the control, to changing the hierarchical data structure 110 to reflect the change for future uses. In an example, where the access vector is a person and the control enables a user of the user interface to deselect access for the person, updating the hierarchical data structure includes removing access for the person. In an example, the person is selected to lose access to the element based on a status change in an organization. For example, if a manager had access to employee records for direct reports, but the manager's position change to another group, then the manager's access to the employees who previously reported to the manager are removed. In an example, where the access vector is a person and the control enables a user of the user interface to select access for the person, updating the hierarchical data structure includes adding access for the person.

Figure 2:
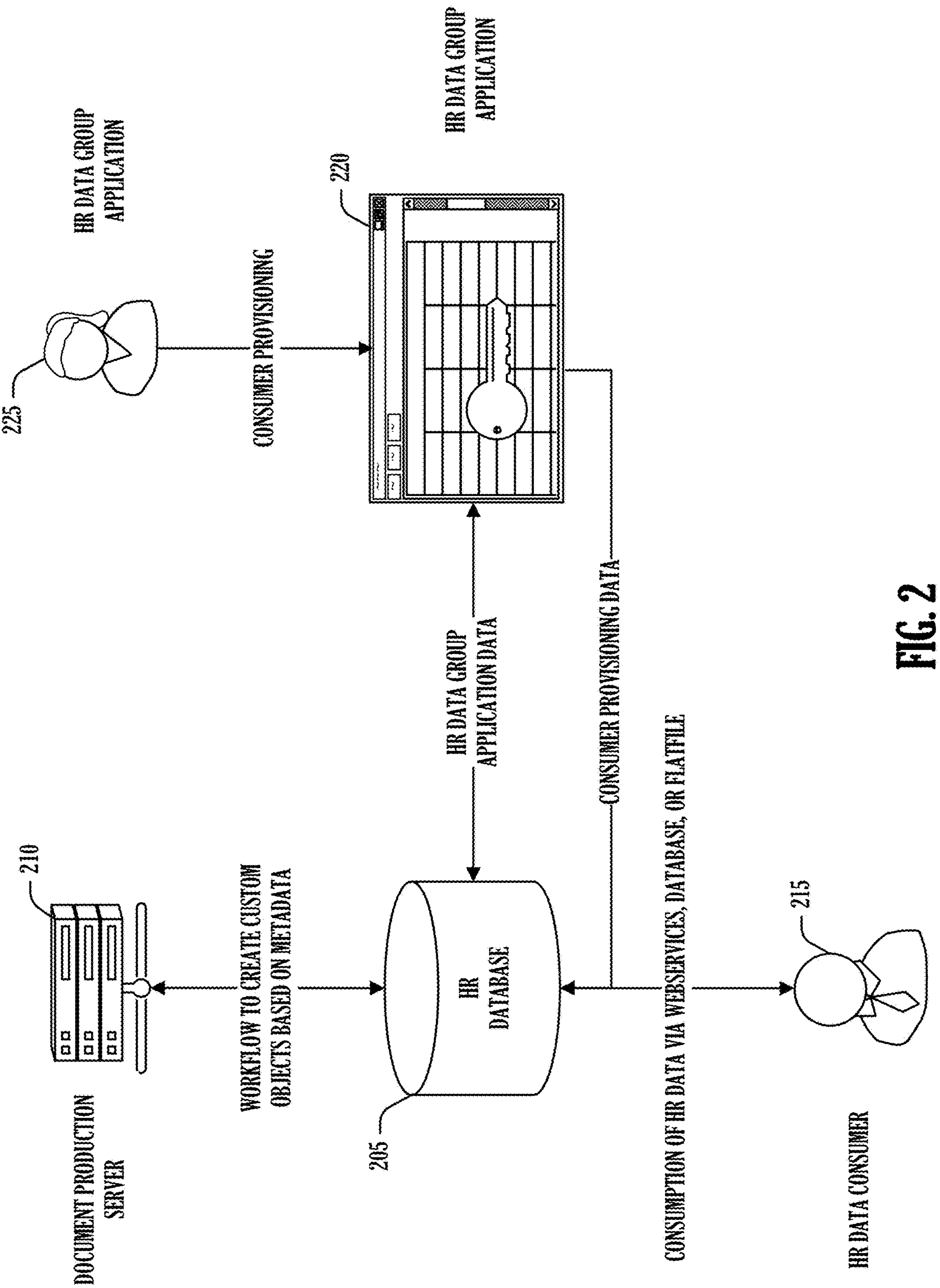
FIG. 2 illustrates an example data flow of sensitive information, according to an embodiment.

FIG. 2 illustrates an example data flow of sensitive information, according to an embodiment. As illustrated, a user 225 interacts with the human resources (HR) data group application 220 (e.g., Common Profile application) to set access permissions (e.g., establish, modify, or remove access controls) for data in the HR database 205. The HR data group application 220 has access to the HR database 205 to present a user interface to the user 225 and accept control inputs from the user 225 to provision data in the HR database 205. The data provisioning, with access controls, provides a mechanism for data integrity when the data is consumed by other users, such as the HR data consumer 215, or other applications, such as the document production server 210.

The HR data group application 220 operates as an entitlement application for fine-grained access to HR data (e.g., represented by the HR database 205). The HR data group application 220 provides the ability to provision at the row or column level within a data warehouse, flat file distributions, or data APIs or web services. The administration portion of the HR data group application 220 user interface enables searching or filtering on consumption vectors (e.g., the data or the API consumers) as well as sending standardized bulk communications.

The HR data group application 220 includes an aspect that operates as an administrative utility that leverages a configuration to permit access to row or column level data. The HR data group application 220 implementation can use a data catalog to which system accounts are provided access. In an example, a batch process or an API can leverage the fine-grained entitlement meta-data to restrict access accordingly. In an example, the HR data group application 220 includes a bulk communication mechanism based on the searching mechanism to enable the ability to send an email to a selected consumers (e.g., those consuming data from a report or other data consumption vector). For example, if a message to all the users of a particular column of data (e.g., after introduction of a new Job Code), or all web service users (e.g., to communicate a planned outage), the data consumption search can used to identify the users and a message sent to each user.

In an example, the HR data group application 220 includes an audit facility. The audit facility produces and enables interaction with audit logs. The Audit logs can provide a historical view of who and what was changed. In an example, the HR data group application 220 can include a meta data facility. The meta data facility provides management of downstream consumer meta data. Such meta data can include contacts, whether a consumer re-distributes data, etc.

FIG. 3 illustrates an example of a user interface to locate sensitive information according to an access vector, according to an embodiment. The illustrated user interface includes an access vector (e.g., data consumption vector) search 305, a record ID search 310, and a contact search 315 (e.g., supervisor, employee, etc.). The search on the bottom is a column (e.g., field) search 320. As illustrated on the popup window, the individual field access is addressed by checkbox controls.

FIG. 4 illustrates an example of a user interface for column level element access control, according to an embodiment. Here, categories of data can be selected in the drop downs 405. Once a category is expended, such as the sensitive category 410, then the individual fields are displayed on the right. Note, at the top, the data consumption vectors are indicated as allowed or not allowed based on the checkbox controls. The listed vectors include database (DB) views access, REST services access, etc. Such column (e.g., element) level access control enables granular control over access to individual columns within a database table, for example. The access control specifies which columns a user or role can access, based on attributes such as user identity, role, or department. The access control can restrict access to sensitive columns, ensuring that users can only view or manipulate the columns they are authorized to access. In an example, the hierarchical data structure (e.g., a database management system) enforces the access control by modifying queries to include or exclude columns based on the defined access rules, thereby protecting sensitive data from unauthorized access.

FIG. 5 illustrates an example of a user interface for row level element access control, according to an embodiment. Row-level database access control is a mechanism that enables granular control over access to individual rows (e.g., records) within the data structure (e.g., a database table). As illustrated, the user interface enables selection of roll access (e.g., employee, contingent worker, etc.) location (e.g., work countries), and whether the access selected is inherited up an organizational chain. The application of the access control can be dynamic, applying conditions at query runtime, or static, with predefined conditions. In an example, the hierarchical data structure enforces the access controls transparently by modifying queries to filter out unauthorized rows.

Figure 6:
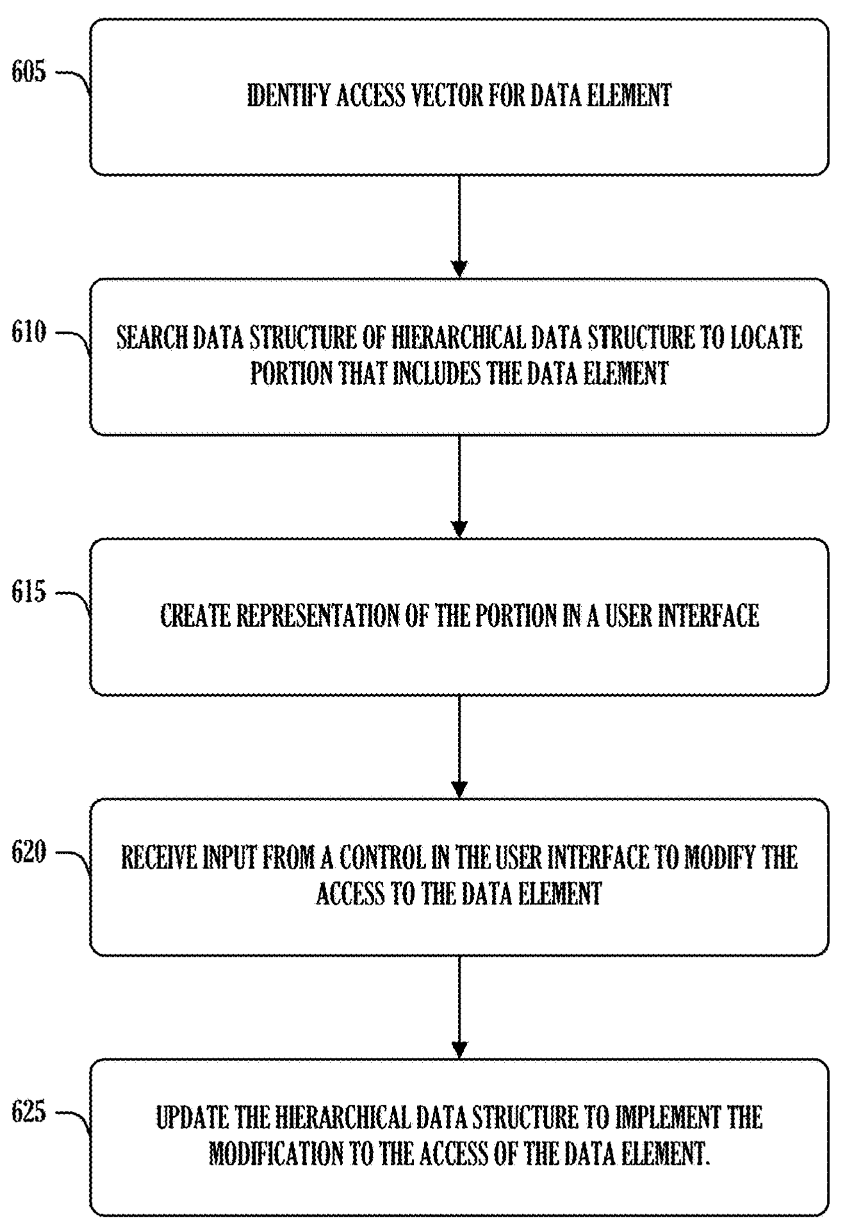
FIG. 6 illustrates a flow diagram of an example of a method for fine-grained data structure element access control, according to an embodiment.

FIG. 6 illustrates a flow diagram of an example of a method 600 for fine-grained data structure element access control, according to an embodiment. The operations of the method 600 are performed by computer hardware, such as that described above or below (e.g., processing circuitry).

At operation 605, an identification of an access vector for an element of hierarchical data structure is obtained. In an example, the access vector is a person.

In an example, the access vector is a service that accesses the hierarchical data structure. In an example, the service provides content to a web page configured to enable an authorized user to access the element. In an example, the service provides content to a file configured to enable an authorized user to access the element when the file is accessed by the authorized user.

At operation 610, the hierarchical data structure is searched based on the identification of the access vector to locate a portion of the hierarchical data structure that includes the element. In an example, the portion of the hierarchical data structure is a record of an employee. In an example, the element is a field in the record. In an example, the method 600 can included the additional operations of establishing a connection to a second data structure that includes a version of data stored in the element, and overwriting the data stored in the element with data from the second data structure via the connection. In an example, the overwriting of the data stored in the element is periodic. In an example, the overwriting of the data stored in the element is based on a trigger.

At operation 615, a representation of the portion of the hierarchical data structure is rendered to a user interface. In an example, the user interface includes a control to assign an access permission to the element. In an example, where the access vector is a person, the control enables a user of the user interface to deselect access for the person. In an example, where the access vector is a person and the person is selected to gain access to the element, wherein the control enables a user of the user interface to select access for the person.

At operation 620, input from the control to modify an access to the hierarchical data structure is received.

At operation 625, the hierarchical data structure is updated based on the input from the control to create an updated hierarchical data structure. In an example, where the access vector is a person and the control enables a user of the user interface to deselect access for the person, updating the hierarchical data structure includes removing access for the person. In an example, the person is selected to lose access to the element based on a status change in an organization. In an example, where the access vector is a person and the control enables a user of the user interface to select access for the person, updating the hierarchical data structure includes adding access for the person.

Figure 7:
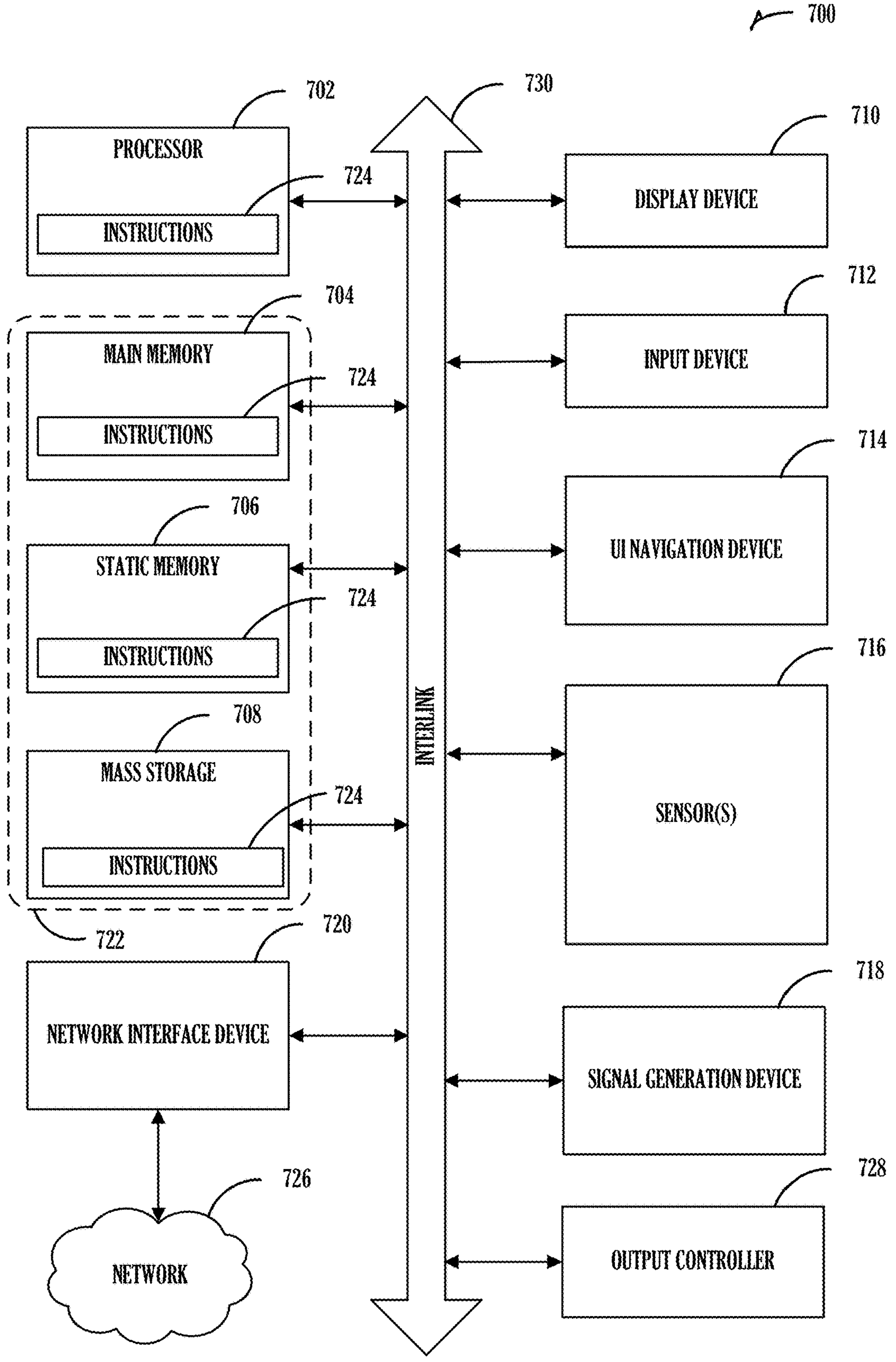
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is an apparatus for fine-grained data structure element access control, the apparatus comprising: a memory configured to hold instructions; and processing circuitry that, when in operation, is configured by the instructions to: obtain an identification of an access vector for an element of a hierarchical data structure; search the hierarchical data structure based on the identification of the access vector to locate a portion of the hierarchical data structure that includes the element; cause a representation of the portion of the hierarchical data structure to be rendered to a user interface, the user interface including a control to assign an access permission to the element; receive input from the control to modify an access to the hierarchical data structure; and update the hierarchical data structure based on the input from the control to create an updated hierarchical data structure.

In Example 2, the subject matter of Example 1, wherein the access vector is a person.

In Example 3, the subject matter of Example 2, wherein the person is selected to lose access to the element, wherein the control enables a user of the user interface to deselect access for the person, and wherein, to update the hierarchical data structure, the processing circuitry is configured to remove access for the person.

In Example 4, the subject matter of Example 3, wherein the person is selected to lose access to the element based on a status change in an organization.

In Example 5, the subject matter of any of Examples 2-4, wherein the person is selected to gain access to the element, wherein the control enables a user of the user interface to select access for the person, and wherein, to update the hierarchical data structure, the processing circuitry is configured to add access for the person.

In Example 6, the subject matter of any of Examples 1-5, wherein the access vector is a service that accesses the hierarchical data structure.

In Example 7, the subject matter of Example 6, wherein the service provides content to a web page configured to enable an authorized user to access the element.

In Example 8, the subject matter of any of Examples 6-7, wherein the service provides content to a file configured to enable an authorized user to access the element when the file is accessed by the authorized user.

In Example 9, the subject matter of any of Examples 1-8, wherein the portion of the hierarchical data structure is a record of an employee, and wherein the element is a field in the record.

In Example 10, the subject matter of any of Examples 1-9, wherein the instructions configure the processing circuitry to: establish a connection to a second data structure that includes a version of data stored in the element; and overwrite the data stored in the element with data from the second data structure via the connection.

In Example 11, the subject matter of Example 10, wherein the processing circuitry is configured to periodically overwrite the data stored in the element.

In Example 12, the subject matter of any of Examples 10-11, wherein the processing circuitry is configured to overwrite the data stored in the element based on a trigger.

Example 13 is a method for fine-grained data structure element access control, the method comprising: obtaining an identification of an access vector for an element of a hierarchical data structure; searching the hierarchical data structure based on the identification of the access vector to locate a portion of the hierarchical data structure that includes the element; rendering a representation of the portion of the hierarchical data structure to a user interface, the user interface including a control to assign an access permission to the element; receiving input from the control to modify an access to the hierarchical data structure; and updating the hierarchical data structure based on the input from the control to create an updated hierarchical data structure.

In Example 14, the subject matter of Example 13, wherein the access vector is a person.

In Example 15, the subject matter of Example 14, wherein the person is selected to lose access to the element, wherein the control enables a user of the user interface to deselect access for the person, and wherein updating the hierarchical data structure includes removing access for the person.

In Example 16, the subject matter of Example 15, wherein the person is selected to lose access to the element based on a status change in an organization.

In Example 17, the subject matter of any of Examples 14-16, wherein the person is selected to gain access to the element, wherein the control enables a user of the user interface to select access for the person, and wherein updating the hierarchical data structure includes adding access for the person.

In Example 18, the subject matter of any of Examples 13-17, wherein the access vector is a service that accesses the hierarchical data structure.

In Example 19, the subject matter of Example 18, wherein the service provides content to a web page configured to enable an authorized user to access the element.

In Example 20, the subject matter of any of Examples 18-19, wherein the service provides content to a file configured to enable an authorized user to access the element when the file is accessed by the authorized user.

In Example 21, the subject matter of any of Examples 13-20, wherein the portion of the hierarchical data structure is a record of an employee, and wherein the element is a field in the record.

In Example 22, the subject matter of any of Examples 13-21, comprising: establishing a connection to a second data structure that includes a version of data stored in the element; and overwriting the data stored in the element with data from the second data structure via the connection.

In Example 23, the subject matter of Example 22, wherein the overwriting of the data stored in the element is periodic.

In Example 24, the subject matter of any of Examples 22-23, wherein the overwriting of the data stored in the element is based on a trigger.

Example 25 is a machine readable medium including instructions for fine-grained data structure element access control, the instructions, when executed by processing circuitry, cause the processing circuitry to perform operations comprising: obtaining an identification of an access vector for an element of a hierarchical data structure; searching the hierarchical data structure based on the identification of the access vector to locate a portion of the hierarchical data structure that includes the element; rendering a representation of the portion of the hierarchical data structure to a user interface, the user interface including a control to assign an access permission to the element; receiving input from the control to modify an access to the hierarchical data structure; and updating the hierarchical data structure based on the input from the control to create an updated hierarchical data structure.

In Example 26, the subject matter of Example 25, wherein the access vector is a person.

In Example 27, the subject matter of Example 26, wherein the person is selected to lose access to the element, wherein the control enables a user of the user interface to deselect access for the person, and wherein updating the hierarchical data structure includes removing access for the person.

In Example 28, the subject matter of Example 27, wherein the person is selected to lose access to the element based on a status change in an organization.

In Example 29, the subject matter of any of Examples 26-28, wherein the person is selected to gain access to the element, wherein the control enables a user of the user interface to select access for the person, and wherein updating the hierarchical data structure includes adding access for the person.

In Example 30, the subject matter of any of Examples 25-29, wherein the access vector is a service that accesses the hierarchical data structure.

In Example 31, the subject matter of Example 30, wherein the service provides content to a web page configured to enable an authorized user to access the element.

In Example 32, the subject matter of any of Examples 30-31, wherein the service provides content to a file configured to enable an authorized user to access the element when the file is accessed by the authorized user.

In Example 33, the subject matter of any of Examples 25-32, wherein the portion of the hierarchical data structure is a record of an employee, and wherein the element is a field in the record.

In Example 34, the subject matter of any of Examples 25-33, wherein the operations comprise: establishing a connection to a second data structure that includes a version of data stored in the element; and overwriting the data stored in the element with data from the second data structure via the connection.

In Example 35, the subject matter of Example 34, wherein the overwriting of the data stored in the element is periodic.

In Example 36, the subject matter of any of Examples 34-35, wherein the overwriting of the data stored in the element is based on a trigger.

Example 37 is a system for fine-grained data structure element access control, the system comprising: means for obtaining an identification of an access vector for an element of a hierarchical data structure; means for searching the hierarchical data structure based on the identification of the access vector to locate a portion of the hierarchical data structure that includes the element; means for rendering a representation of the portion of the hierarchical data structure to a user interface, the user interface including a control to assign an access permission to the element; means for receiving input from the control to modify an access to the hierarchical data structure; and means for updating the hierarchical data structure based on the input from the control to create an updated hierarchical data structure.

In Example 38, the subject matter of Example 37, wherein the access vector is a person.

In Example 39, the subject matter of Example 38, wherein the person is selected to lose access to the element, wherein the control enables a user of the user interface to deselect access for the person, and wherein the means for updating the hierarchical data structure include means for removing access for the person.

In Example 40, the subject matter of Example 39, wherein the person is selected to lose access to the element based on a status change in an organization.

In Example 41, the subject matter of any of Examples 38-40, wherein the person is selected to gain access to the element, wherein the control enables a user of the user interface to select access for the person, and wherein the means for updating the hierarchical data structure include means for adding access for the person.

In Example 42, the subject matter of any of Examples 37-41, wherein the access vector is a service that accesses the hierarchical data structure.

In Example 43, the subject matter of Example 42, wherein the service provides content to a web page configured to enable an authorized user to access the element.

In Example 44, the subject matter of any of Examples 42-43, wherein the service provides content to a file configured to enable an authorized user to access the element when the file is accessed by the authorized user.

In Example 45, the subject matter of any of Examples 37-44, wherein the portion of the hierarchical data structure is a record of an employee, and wherein the element is a field in the record.

In Example 46, the subject matter of any of Examples 37-45, comprising: means for establishing a connection to a second data structure that includes a version of data stored in the element; and means for overwriting the data stored in the element with data from the second data structure via the connection.

In Example 47, the subject matter of Example 46, wherein the overwriting of the data stored in the element is periodic.

In Example 48, the subject matter of any of Examples 46-47, wherein the overwriting of the data stored in the element is based on a trigger.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms “comprising” and “wherein.” Also, in the following claims, the terms “including” and “comprising” are open-ended, that is, a system, device, article, or process that includes elements in addition to those listed after such a term in a claim are still deemed to fall within the scope of that claim. Moreover, in the following claims, the terms “first,” “second,” and “third,” etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus comprising:

a memory configured to hold instructions; and processing circuitry that, when in operation, is configured by the instructions to:

obtain an identification of a data consumer for a hierarchical data structure;

search the hierarchical data structure based on the identification of the data consumer to locate a portion of the hierarchical data structure that includes an element of the hierarchical data structure, wherein the search is performed by finding the data consumer in a consumption data structure for the element, the consumption data structure configured to track use of the element by data consumers;

cause a representation of the portion of the hierarchical data structure to be rendered to a user interface, the user interface including a control to assign an access permission that is specific to the element;

receive input from the control to modify an access to the hierarchical data structure; and update the hierarchical data structure based on the input from the control to create an updated hierarchical data structure.

2. The apparatus of claim 1, wherein the data consumer is a person.

3. The apparatus of claim 2, wherein the person is selected to lose access to the element, wherein the control enables a user of the user interface to deselect access for the person, and wherein, to update the hierarchical data structure, the processing circuitry is configured to remove access for the person.

4. The apparatus of claim 3, wherein the person is selected to lose access to the element based on a status change in an organization.

5. The apparatus of claim 1, wherein the data consumer is a service that accesses the hierarchical data structure.

6. The apparatus of claim 5, wherein the service provides content to a web page configured to enable an authorized user to access the element.

7. The apparatus of claim 5, wherein the service provides content to a file configured to enable an authorized user to access the element when the file is accessed by the authorized user.

8. The apparatus of claim 1, wherein the instructions configure the processing circuitry to:

establish a connection to a second data structure that includes a version of data stored in the element; and overwrite the data stored in the element with data from the second data structure via the connection.

9. A non-transitory machine readable medium including instructions that, when executed by processing circuitry, cause the processing circuitry to perform operations comprising:

obtaining identification of a data consumer for a hierarchical data structure;

searching the hierarchical data structure based on the identification of the data consumer to locate a portion of the hierarchical data structure that includes an element of the hierarchical data structure, wherein the searching includes finding the data consumer in a consumption data structure for the element, the consumption data structure configured to track use of the element by data consumers;

rendering a representation of the portion of the hierarchical data structure to a user interface, the user interface including a control to assign an access permission that is specific to the element;

receiving input from the control to modify an access to the hierarchical data structure; and updating the hierarchical data structure based on the input from the control to create an updated hierarchical data structure.

10. The non-transitory machine readable medium of claim 9, wherein the data consumer is a person.

11. The non-transitory machine readable medium of claim 10, wherein the person is selected to lose access to the element, wherein the control enables a user of the user interface to deselect access for the person, and wherein updating the hierarchical data structure includes removing access for the person.

12. The non-transitory machine readable medium of claim 11, wherein the person is selected to lose access to the element based on a status change in an organization.

13. The non-transitory machine readable medium of claim 10, wherein the person is selected to gain access to the element, wherein the control enables a user of the user interface to select access for the person, and wherein updating the hierarchical data structure includes adding access for the person.

14. The non-transitory machine readable medium of claim 9, wherein the data consumer is a service that accesses the hierarchical data structure.

15. The non-transitory machine readable medium of claim 14, wherein the service provides content to a web page configured to enable an authorized user to access the element.

16. The non-transitory machine readable medium of claim 14, wherein the service provides content to a file configured to enable an authorized user to access the element when the file is accessed by the authorized user.

17. The non-transitory machine readable medium of claim 9, wherein the portion of the hierarchical data structure is a record of an employee, and wherein the element is a field in the record.

18. The non-transitory machine readable medium of claim 9, wherein the operations comprise:

establishing a connection to a second data structure that includes a version of data stored in the element; and overwriting the data stored in the element with data from the second data structure via the connection.

19. The non-transitory machine readable medium of claim 18, wherein the overwriting of the data stored in the element is periodic.

20. The non-transitory machine readable medium of claim 18, wherein the overwriting of the data stored in the element is based on a trigger.

* * * * *